United States Patent [19]
Lindenthal et al.

[11] Patent Number: 4,529,392
[45] Date of Patent: Jul. 16, 1985

[54] UNIVERSAL JOINT SHAFT WITH ALIGNING APPARATUS

[75] Inventors: Hans Lindenthal, Heidenheim; Herbert Depping, Giengen, both of Fed. Rep. of Germany

[73] Assignee: J. M. Voith GmbH, Fed. Rep. of Germany

[21] Appl. No.: 473,109

[22] Filed: Mar. 7, 1983

[30] Foreign Application Priority Data

Mar. 11, 1982 [DE] Fed. Rep. of Germany ....... 3208780

[51] Int. Cl.$^3$ ........................... F16D 3/20; F16D 3/26
[52] U.S. Cl. .................................... 464/112; 464/134; 464/136
[58] Field of Search ............... 464/112, 117, 127, 134, 464/136, 904, 905; 16/49, 66, 374–379

[56] References Cited

U.S. PATENT DOCUMENTS

| | | | |
|---|---|---|---|
| 3,339,379 | 9/1967 | Snyder | 464/8 |
| 4,124,999 | 11/1978 | Hirasawatsu et al. | 464/2 |
| 4,195,495 | 4/1980 | Sehlbach et al. | 464/117 |

FOREIGN PATENT DOCUMENTS

| | | |
|---|---|---|
| 7716089 | 11/1973 | Fed. Rep. of Germany . |
| 2711177 | 8/1978 | Fed. Rep. of Germany . |
| 2926710 | 1/1981 | Fed. Rep. of Germany . |
| 7802412 | 9/1978 | Sweden . |
| 239721 | 7/1969 | U.S.S.R. . |

*Primary Examiner*—Stuart S. Levy
*Assistant Examiner*—Thomas R. Hannon
*Attorney, Agent, or Firm*—Ostrolenk, Faber, Gerb & Soffen

[57] ABSTRACT

The disclosure concerns a universal joint shaft having two coupling forks joined at a journal cross. Various embodiments of aligning apparatus selectively restrict the journal forks to adjust the angle of bend with respect to each other. In one embodiment, a tube radially outside the coupling forks and journal cross is supported on one fork and is driven by a pressure cylinder against the other fork to restrict the bending of the forks with respect to each other at the journal cross. In other embodiments, one or more piston/cylinder units are provided on one of the forks, with the piston being movable against a bearing point on the other fork for restricting the extent to which the other forks may bend. Pressure medium is delivered to the pistons through a pressure medium line controlled by a pressure maintaining valve which is shiftable for permitting pressure medium to pass to the piston/cylinder unit or to stop passing thereto.

10 Claims, 5 Drawing Figures

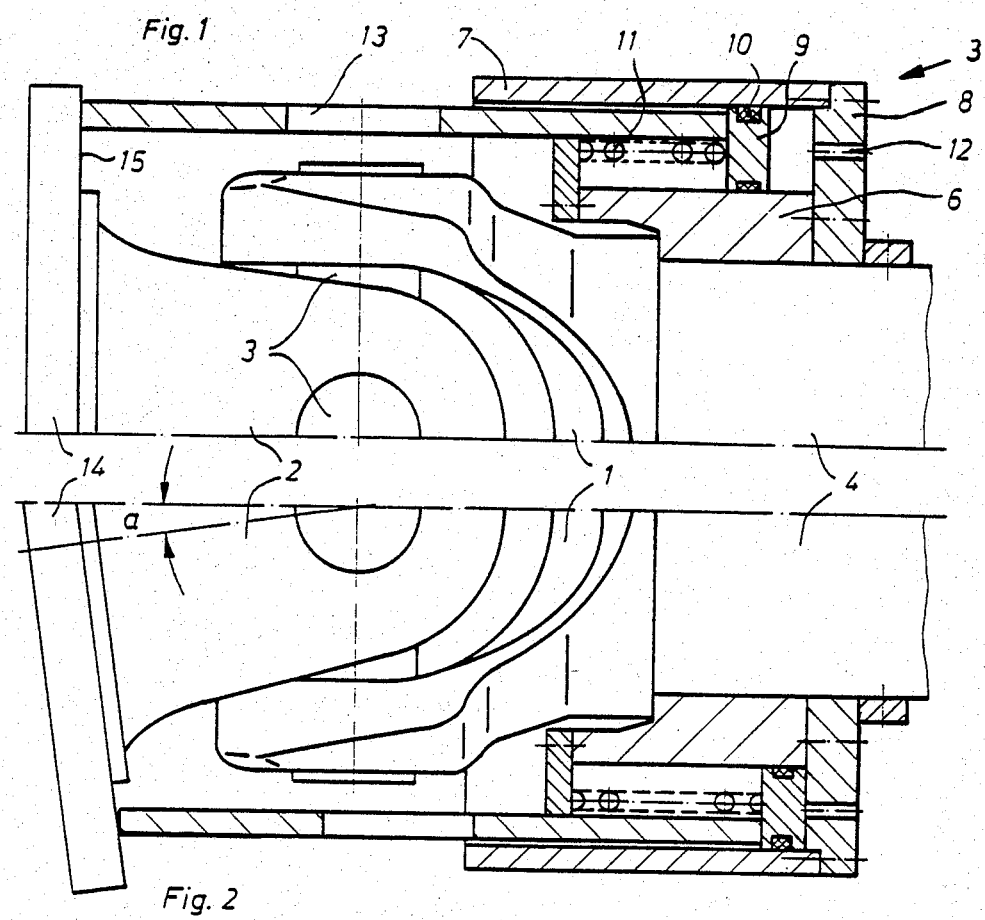
Fig. 1
Fig. 2
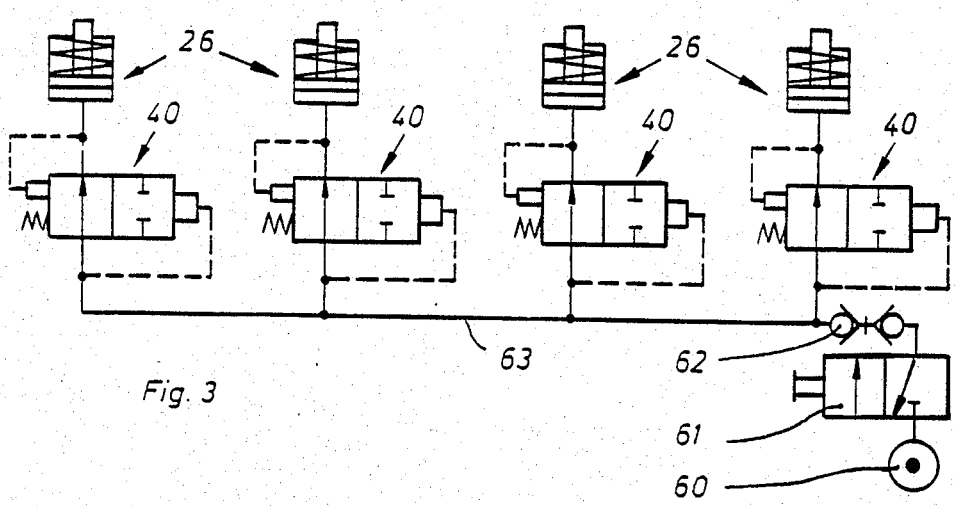
Fig. 3

UNIVERSAL JOINT SHAFT WITH ALIGNING APPARATUS

BACKGROUND OF THE INVENTION

The invention relates to a universal joint and particularly to a Cardan type cross coupling comprising two coupling halves or forks and a stop which can be smoothly adjusted axially to restrict the bend angle between the coupling halves. The stop may be located radially outside the cross coupling.

The foregoing device is found especially in cross couplings used in heavy machinery, e.g. in the drives of rolling mills, i.e. where the shafts have large dimensions. Such shafts cannot be brought manually into the necessary assembly position and be pushed into the centering arrangement, due to the weight and the friction in the couplings. For example, when the rollers are being changed, the shafts have to be supported by lifting tools and the freely movable coupling halves must be lined up in the assembly position.

An assembly aid already exists in the form of the pivot-angle restriction known from German Petty Patent DE-GM 77 16089. In this case, fixed stops on the coupling halves ensure that a coupling half bends only up to a maximum pivot-angle, which lies just above the bend angle which occurs during operation. Another bend angle restriction is known from German Patent De-PS 2,711,177. In this case, two bolts, which are attached one to each coupling half and which penetrate into a central bore in the journal cross, restrict the angular movement of the coupling by resting on each other. Another bend angle restriction is disclosed in U.S. Pat. No. 4,195,495, which consists of two tubular sleeves, one attached to each of the coupling halves. These sleeves surround the coupling and come into contact with each other when the maximum bend angle is reached. The maximum bend angle can be adjusted by rotating the tubular sleeves. SE-AS 420,640 disclosed the maximum bend angle being restricted by a stop on two hemispherical parts which slide into each other and which enclose the coupling. A further bend angle restriction is known from U.S. Pat. No. 3,339,379 in which hook-shaped restricting members prevent the coupling from bending too much.

A disadvantage with the known devices is that after the adjoining machine part, e.g. a roller, has been removed, the coupling can move freely and drops downward under its weight until it reaches its stop. This makes subsequent re-assembly considerably more difficult. In addition, the permissible bending of the coupling during operation is considerably restricted.

SUMMARY OF THE INVENTION

It is the object of the invention to restrict the movement of a universal joint shaft coupling in its resting state, i.e. not during rotation, to a maximum bent position, to line up the coupling in every bending position, up to the rectilinear state, and to hold it in every intermediate position, without the application of any unacceptable external force. Moreover, the unrestricted movement of the coupling should be assured during operation, without any return forces being exerted.

According to the invention, usually in its radially outer region, the coupling has a piston/cylinder unit which is supported on one of the coupling halves and which can carry out a stroke when loaded with pressure medium. The leading edge of the movable piston then comes into contact with an external surface on the second coupling half. If the piston then carries out a further stroke movement while the second coupling half is in a bent state and is freely movable, i.e. is not attached to a machine part, then the second coupling half is moved around the center point of the coupling until the bend angle has reached zero degrees. The coupling is brought into the rectilinear position in which the longitudinal axis of the two halves of the universal joint or coupling line up with each other. This may mean a vertical alignment or a horizontal alignment, or both at the same time. By controlling the supply of pressure medium, it is also possible to align the freely movable halves of the universal joint or coupling merely up to a desired bend angle, such as may be required for assembly, for example.

In a further embodiment of the apparatus according to the invention, the piston/cylinder unit provided on one coupling half forms a stop for the second coupling half. This stop would be rigid and unmoving both when the adjustment piston is fully in its rest position and also at every angular position of the coupling between the rectilinear position and the maximum bent position. This only requires that the supply of pressure medium to the piston/cylinder unit be interrupted and that the pressure medium simultaneously be prevented from flowing back.

As a particular advantage of the invention, when pressure medium is supplied, the movable piston of the piston/cylinder unit can also be brought up to and pressed against an external surface on the second coupling half when the second coupling half, i.e. for example, the flange yoke on a coupling shaft, is still attached to the driving or driven machine part. If the rotationally fixed connection with this machine part is now released, the coupling is held in the bent position it occupied last and does not drop down under the force of gravity into a position which is unfavorable for assembly. This position-holding of the coupling considerably facilitates re-assembly. However, it is important that the piston be able to return into its retracted terminal position after the assembly of the coupling and the adjoining machine part has been completed, thereby restoring the coupling to its full movement capacity.

Above all, the disadvantages which are displayed by the couplings in German published application DE-OS 29 26 710 or in SU-PS 23 9721, for example, are also eliminated by the invention. In these couplings a bar which is attached to the two coupling halves and penetrates through the journal cross prevents the coupling from moving freely and without hindrance.

In one embodiment of the invention, the piston/cylinder unit encloses the entire cross coupling. It is in the form of a tube and includes an annular piston. This unit is fitted to the first coupling half which is preferably attached to the central section of the universal joint shaft. When the pressure builds up, the leading edge of the annular piston comes to rest on the rear face of the second coupling half, e.g. on a universal joint shaft flange. With a further supply of pressure, this flange is now either held in its present position or is moved into the rectilinear position, irrespective of its previous position.

In a further embodiment of the invention, the piston/cylinder unit is made as a self-contained component. This unit is attached to the rear face, i.e. the face of the coupling halves which faces in toward the universal joint, in such a way that the bearing points of the forks of the coupling halves move onto the piston when bending occurs. To adjust the coupling, the pressure-loaded piston pushes the other coupling fork into the desired position. At the same time the piston forms the stop for the bearing point of the fork every time the stroke is adjusted by the supply of pressure.

There may be a pressure-maintaining valve in the supply line to the piston/cylinder unit. This valve closes the pressure medium supply to the cylinder when high static pressure has built up in the piston/cylinder unit, i.e. when, despite loading with pressure, the piston no longer carries out a stroke. The pressure-maintaining valve contains a piston with two different area end faces which are connected via a longitudinal bore. If the pressure exerted by the pressure medium source on the large piston surface preponderates, then the piston moves counter to a spring force and blocks the pressure medium outlet beyond the smaller piston surface. This obstructs the supply of pressure medium into and the return flow from the cylinder of the piston/cylinder unit. In this way, the coupling is held in its present position at the time.

The invention is not restricted to use on universal joint shafts but may also be used, for example, for curved teeth shafts and flat journal shafts.

Other objects and features of the invention are described below with reference to the accompanying drawings.

BRIEF DESCRIPTION OF THE DRAWINGS

FIG. 1 is a longitudinal sectional view through a Cardan coupling with a sleeve-shaped adjustment device and with the coupling in the rectilinear position.

FIG. 2 is the same type of view of the Cardan coupling in FIG. 1, in the bent position.

FIG. 3 is a control diagram for an adjustment device, with four separate adjustment pistons for a second embodiment of such coupling.

DESCRIPTION OF THE PREFERRED EMBODIMENTS

Figure 4:
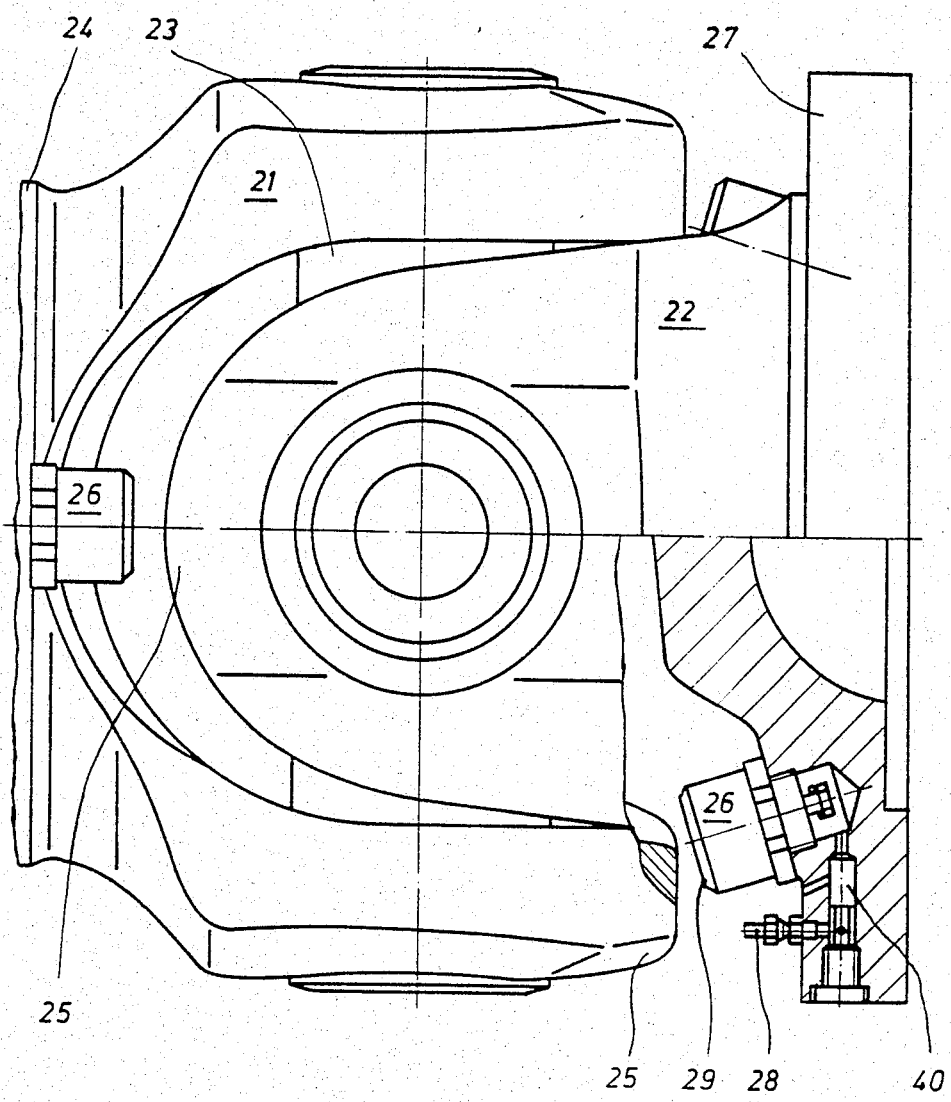
FIG. 4 is a partially sectional, longitudinal view of a second embodiment of a Cardan coupling, with four adjustment pistons which act on bearing points of the opposite coupling forks.

FIG. 1 shows a cross coupling comprised of a first coupling half 1 and a second coupling half 2, both of which are constructed as Cardan coupling forks and are connected to each other in a known way via a journal cross 3. The coupling fork 1 is connected to the central section 4 of a universal joint shaft. That shaft 4 supports the piston/cylinder unit 5 of the first embodiment. This unit is comprised of an inner, annular cylinder 6 and an outer, annular cylinder wall 7 spaced from the inner lining 6. The lining 6 and wall 7 are connected at one end by a cylinder head 8. An annular piston 9 is movable axially along the cylinder chamber defined between the lining 6 and the wall 7. The annular piston 9 has seals 10 to the cylinder walls 6 and 7. The piston 9 is normally pressed by a spring 11 against the cylinder head 8. An annular cylinder for the piston 9 is defined between the piston 9 and the cylinder 8. In the region of the cylinder head 8, there is a connection 12 for the supply of pressure medium to the cylinder.

On the end face of the annular piston 9, which faces toward the center point of the coupling and toward the rear face 15 of the flange 14 of the coupling fork 2, a tubular sleeve 13 is attached. Its internal diameter is slightly greater than the rotational diameter of the cross coupling. The axial length of the sleeve 13 is dimensioned so that the coupling fork 2 can accomplish the required bend angle with the fork 1 during operation, without hindrance and without the rear face 15 of the coupling fork 2, made as a flange 14, for example, coming into contact with the sleeve 13, until the maximum bend angle is reached.

When pressure medium is supplied via the connection 12, the annular piston 9 is moved counter to the spring pressure, if the forks are bent at bend angle a, and this shifts the sleeve 13 onto the rear face 15 of the flange 14. The sleeve 13 presses against the rear face of the flange 14 and this brings the coupling fork 2 into the rectilinear position so that the axes of the coupling forks 1 and 2 line up as shown in FIG. 1, provided that the coupling fork can move freely.

FIG. 2 shows the coupling of FIG. 1, but in the bent position at bend angle a. For this position, the annular piston 9 is located in its uppermost position, at the cylinder head 8. The leading edge of the sleeve 13 now serves as a bend angle restriction for the coupling fork 2. By a controlled supply of pressure medium to inlet 12, the bend angle a can be smoothly adjusted for assembly.

FIG. 4 shows another embodiment of a piston/cylinder unit according to the invention. The two coupling forks 21 and 22 of a cross coupling are connected by a journal cross 23. Piston/cylinder units 26 are fitted at each of the points where the bearing point 25 of one coupling fork would come into contact with the other coupling fork, when there is extreme bending of the coupling. There are four of these piston/cylinder units 26 per coupling. Two units are provided on the rear face of the flange 27 on fork 22, opposite the fork ends of the fork 21. Two units are provided on the central section 24 of the universal joint shaft to which the fork 21 is attached, opposite the fork ends (not shown) of the fork 22.

A pressure medium connection 28 leads to each piston/cylinder unit 26. A pressure-maintaining valve 40 is connected between the connection 28 and the piston/cylinder unit 26. The distance between the leading edge 29 of each piston and the adjacent opposite bearing point 25 is sufficient to ensure that when the piston is in its retracted rest position, the coupling has unrestricted movement and bending.

Figure 5:
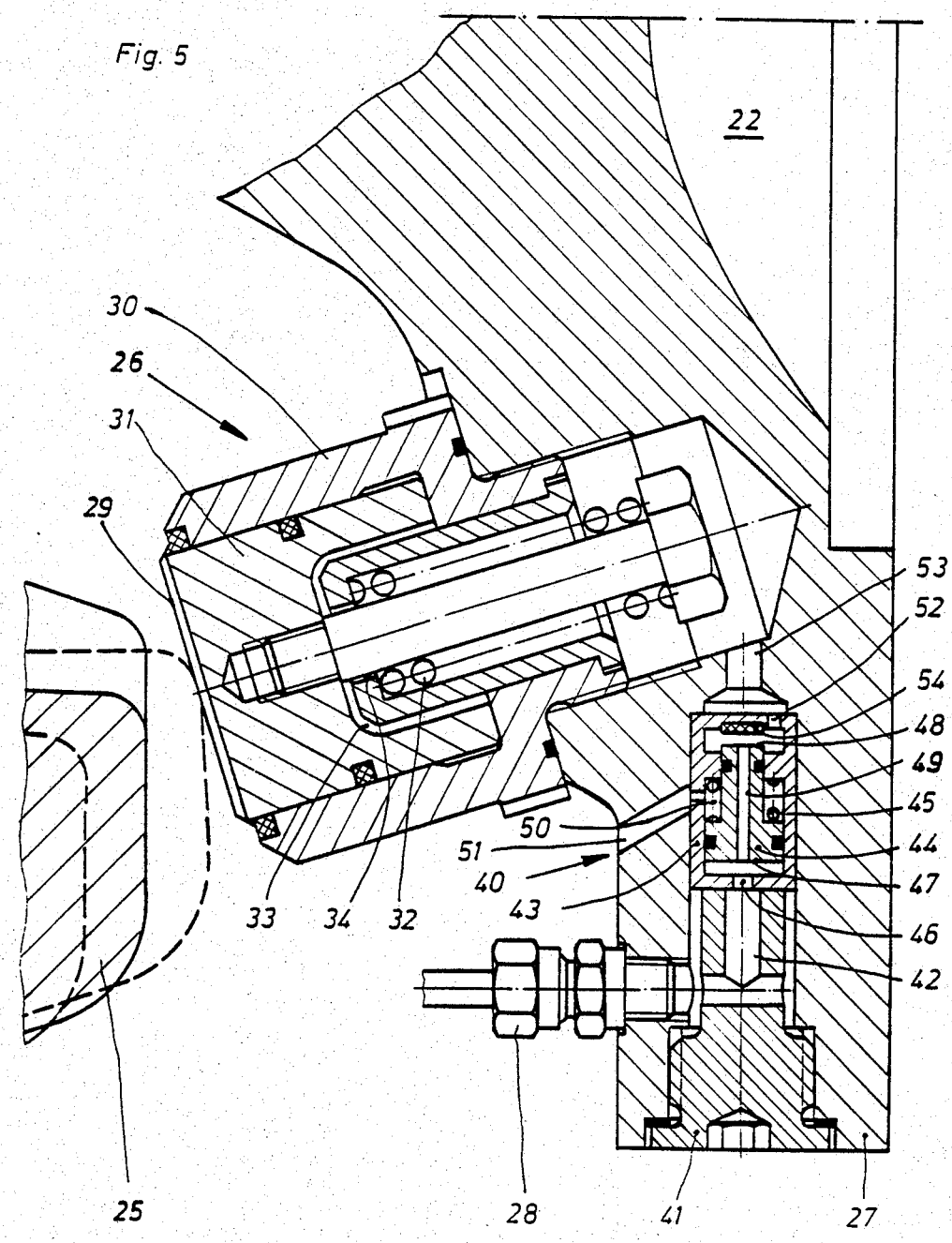
FIG. 5 is a longitudinal sectional view through an adjustment piston with a pressure-maintaining valve, of the type shown in FIG. 4.

FIG. 5 shows a section through the piston/cylinder unit 26 and the pressure-maintaining valve 40 shown in FIG. 4. Corresponding parts are designated by the same numerals. In a cylinder 30, which is attached to the rear face of the flange 27 of the coupling fork 22, there is a piston 31. A return spring 32 holds the piston 31 in its rest position. According to one embodiment of the invention, the piston/cylinder unit is a self-contained unit which can be replaced in the complete, assembled state.

The pressure-maintaining valve 40 is built directly into the flange 27, and is fixed with a screw 41. The screw is provided with a suitable axial bore 42 for the supply of pressure medium.

The pressure-maintaining valve 40 comprises a valve housing 43 in which a piston 44 is arranged so that it seals and can be displaced axially against the force of a spring 45. The piston 44 has a larger area piston surface 47 which faces toward the pressure medium supply flow through the bore 46 and has an opposite, smaller area piston surface 48. The two piston surfaces are connected to each other via an axial bore 49. The annular space 50 created by the different diameter piston surfaces is vented through a bore 51 leading into a pressure-free space. The supply to the piston/cylinder unit 26 is through a bore 52 in the housing 43 and a bore 53 in the flange 27.

If pressure medium is supplied via the connection 28, this flows first through the bore 42 in the fixing screw 41, then through the bores 46, 49 and 52 in the pressure-maintaining valve 40 and the bores 53 and 34, into a pressure chamber 33 in the piston/cylinder unit. After a corresponding pressurized stroke, the end face 29 of the piston 31 comes to rest on the bearing point 25. If the universal joint shaft flange is still attached to a machine part, e.g. a roller, and if the coupling is to be held in this position, then a further supply of pressure to the connection 28 has the following effect. Due to the different size end faces 47 and 48, the force on the larger surface 47 preponderates, so that the piston 44 is moved axially against the spring 45 and comes to rest against a seal 54. Further supply to the pressure chamber 33 in front of the piston 31 is thereby interrupted, so that the piston 31 is held in the position it occupies at that moment. The piston 44 does not rise from the seal 54 again until pressure to the supply line 28 is relieved, i.e. after the assembly work has been finished. This sealing prevents the pressure medium from flowing back from the pressure chamber 33. When the piston 31 moves into its rest position, the supply line 28 is relieved, and this gives the coupling back its full movement.

FIG. 3 shows a control diagram for supplying all four piston/cylinder units 26 provided on a coupling of FIG. 4. All the piston/cylinder units and pressure-maintaining valves 40 are connected to the same pressure medium source 60 and are controlled centrally by a valve 61 and a plug connection 62. The coupling concerned is thereby held securely all round at all units 26 in a predetermined bent position or in the rectilinear position.

There is also the possibility of providing hydraulic spring-loading (not shown). With this the piston/cylinder unit can be used advantageously as a sprung bend angle restriction, if the system of lines remains filled continuously with a pressure medium, without the pressure-maintaining valve 40.

Moreover, all the piston/cylinder units provided on a complete coupling can each be separately loaded with pressure medium (not shown), i.e. not via a common multiple line. This affords the possibility of pivoting the freely movable coupling halves in any desired direction, as may be necessary, for example, for inserting the wobbler in a rolling mill.

Furthermore, the aligning apparatus according to the invention opens up the possibility that the hydraulically loaded piston/cylinder units can be operated to make the freely moving coupling halves carry out rocking movements, by supplying pressure medium in surges or pulsatingly. This would make it easier to thread the centering arrangement into the adjacent machine part.

Although the present invention has been described in connection with preferred embodiments thereof, many variations and modifications will now become apparent to those skilled in the art. It is preferred, therefore, that the scope of the invention be limited not by the specific disclosures herein, but only by the appended claims.

What is claimed is:

1. The universal joint shaft with a coupling, comprising a first coupling fork and a second coupling fork; the forks being oriented at different angles with respect to each other; a journal cross disposed between the two coupling forks and the forks being pivotally connected to the journal cross;

a stop for restricting the bend angle between the coupling forks at the journal cross; the stop being adjustable along the axial direction of the coupling for selectively restricting the bend angle of the coupling forks to selected extents;

stop adjusting means for adjusting the stop in the axial direction of the coupling for selective bend angle restriction of the coupling forks; the stop adjusting means comprises a piston/cylinder unit connected with the stop for moving the stop for selective bend angle restriction and the piston/cylinder unit being connected to a pressure medium source for activating the piston/cylinder unit for rapid adjusting of the stop.

2. The universal joint shaft of claim 1, wherein the connection to the pressure medium source comprises a pressure medium line; a pressure maintaining valve in the pressure medium line for maintaining pressure in the cylinder of the piston/cylinder unit connected to the pressure medium line.

3. The universal joint shaft of claim 1, wherein the cylinder of the piston/cylinder unit is supported on the first fork and the stop comprises the piston of the piston/cylinder unit; the piston being axially displaceable in the cylinder of the piston/cylinder unit; the second fork having a bearing point opposite the piston, and the piston being displaceable with respect to the bearing point for restricting the movement of the bearing point selectively restricting the bend angle of the forks.

4. The universal joint shaft of claim 3, wherein the first fork is connectable to a machine part to be driven, and the second fork is connectable to the central section of the universal drive shaft.

5. The universal joint shaft of claim 3, further comprising a second piston/cylinder unit, including a second cylinder, which is supported on the second fork; the second unit including a second piston which comprises a second stop, and the second piston being axially displaceable in the second cylinder of the second piston/cylinder unit;

the first fork having a second bearing point opposite the second piston, and the second piston being displaceable with respect to the second bearing point for selectively adjusting the bend angle of the forks.

6. The universal joint shaft of claim 5, further comprising two of the first mentioned piston/cylinder units at respective diametral positions on the first fork, and two of the second piston/cylinder units at respective second diametral positions on the second fork.

7. The universal joint shaft of claim 5, wherein there is a connection to the pressure medium source for each piston/cylinder unit, wherein the connection to the pressure medium source comprises a pressure medium line; a pressure maintaining valve in the pressure medium line for maintaining pressure in the cylinder of the piston/cylinder unit connected to the pressure medium line.

8. The universal joint shaft of claim 3, wherein the connection to the pressure medium source comprises a pressure medium line; a pressure maintaining valve in the pressure medium line for maintaining pressure in the cylinder of the piston/cylinder unit connected to the pressure medium line.

9. The universal joint shaft of claim 3, wherein the pressure maintaining valve is adapted for enabling the pressure medium to be fed to the piston/cylinder unit until the piston of the piston/cylinder unit is displaced against the bearing point on the second fork, and the valve thereafter being activated for blocking further flow of pressure medium past the valve, as pressure builds up in the pressure medium line.

10. The universal joint shaft of claim 9, wherein the pressure maintaining valve comprises a housing and a valve piston shiftable through the housing; the valve piston having a larger area piston surface thereon facing toward the pressure medium line, a smaller area piston surface thereon opposite the larger area surface, and a passage past the piston between the larger and smaller area piston surfaces; the housing having respective sides communicating with the larger and smaller area surfaces, and the housing sides being sealed apart by the piston; the cylinder of the piston/cylinder unit communicating into the housing at the side of the housing communicating with the small area piston surface;

a seal in the housing against which the smaller area piston surface may be biased for sealing the passage; a spring for driving the piston to separate the smaller area surface from the seal;

whereby when pressure against the larger area surface of the piston is great enough, the valve piston is axially shifted to move the smaller area surface against the seal, which blocks flow of pressure medium to the piston/cylinder unit.

* * * * *